United States Patent
Sakazawa et al.

(10) Patent No.: US 6,701,373 B1
(45) Date of Patent: Mar. 2, 2004

(54) DATA TRANSMISSION APPARATUS

(75) Inventors: Shigeyuki Sakazawa, Saitama (JP); Yasuhiro Takishima, Tokyo (JP); Masahiro Wada, Kanagawa (JP)

(73) Assignee: KDD Corporation, Tokyo (JP)

( * ) Notice: Subject to any disclaimer, the term of this patent is extended or adjusted under 35 U.S.C. 154(b) by 758 days.

(21) Appl. No.: 09/613,287

(22) Filed: Jul. 10, 2000

(30) Foreign Application Priority Data

Jul. 12, 1999 (JP) .......................................... 11/197088

(51) Int. Cl.$^7$ ............................................. G06F 15/16
(52) U.S. Cl. ........................ 709/232; 709/233; 709/238
(58) Field of Search ................................ 709/232, 233, 709/234, 235, 238, 244, 250, 225

(56) References Cited

U.S. PATENT DOCUMENTS

| | | | | |
|---|---|---|---|---|
| 5,444,718 A | * | 8/1995 | Ejzak et al. ................. | 714/748 |
| 5,815,508 A | * | 9/1998 | Wadzinske et al. .......... | 714/704 |
| 5,818,852 A | * | 10/1998 | Kapoor ........................ | 714/749 |
| 5,878,220 A | * | 3/1999 | Olkin et al. ................. | 709/217 |
| 6,349,350 B1 | * | 2/2002 | Hathorn et al. .............. | 710/36 |
| 6,480,489 B1 | * | 11/2002 | Muller et al. ................ | 370/389 |
| 6,574,770 B1 | * | 6/2003 | Daudelin ..................... | 714/776 |

FOREIGN PATENT DOCUMENTS

JP      3-89547      4/1991

* cited by examiner

*Primary Examiner*—Zarni Maung
(74) *Attorney, Agent, or Firm*—Westerman, Hattori, Daniels & Adrian, LLP

(57) ABSTRACT

When a predetermined amount of data is written in a file of a magnetic disk, a data pack creating section creates a data pack. A plurality of transmission threads allocates the data pack, and transmits it to a plurality of receiving threads via a connection. The received data pack is written in a magnetic disk. The transmission threads register a data pack, a transmission starting flag and a file position of the data pack in a transmission control table included in a transmission control section. The transmission threads are operated independently from each other, and when finishing a transmission of the allocated data pack, first, investigate a retry queue, and then, transmit a data pack if the data pack exists in the retry queue, and request a data pack from the data pack creating section so as to transmit the data pack if no data pack exists, in the retry queue. Therefore, according to the present invention, it is possible to provide a data transmission apparatus which can transmit a high quality file at a high speed.

12 Claims, 2 Drawing Sheets

Fig. 2
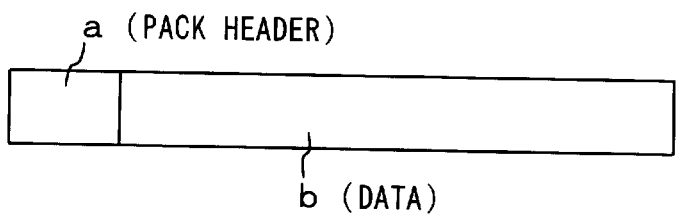
Fig. 3
| NUMBER OF TRANSMISSION THREAD | DATA PACK | TRANSMISSION STARTING FLAG | FILE POSITION OF DATA PACK |
|---|---|---|---|
| 1 | D1 | 1 | S1 |
| 2 | D2 | 1 | S2 |
| ⋮ | ⋮ | ⋮ | ⋮ |
(TRANSMISSION CONTROL TABLE)
Fig. 4A  PRIOR ART
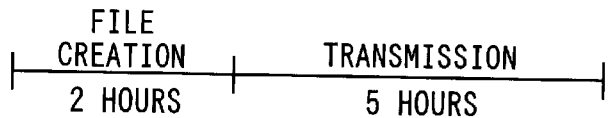
Fig. 4B
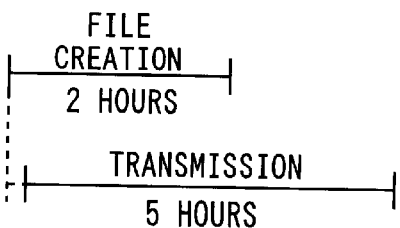

DATA TRANSMISSION APPARATUS

BACKGROUND OF THE INVENTION

1. Field of the Invention

The present invention relates to a data transmission apparatus, and in particular, to a data transmission apparatus which can transmit a high quality file to a remote site at a high speed.

2. Description of the Related Art

Conventionally, a file transmission has been performed using a TCP/IP protocol. The TCP/IP protocol has a function of re-transmitting data corresponding to erroneous data in the case where an error is generated during transmission, and has features capable of finally performing a file transmission without an error. However, in a line having a transmission path delay, in the case where the above TCP/IP protocol is used, an answer whether or not a data is correctly transmitted from a communication partner is late in coming back; for this reason, at a sender side, a timing of transmitting a new data becomes late. As a result, a problem has arisen such that a through put is reduced. In view of the above problem, a proposal has been made such that a file is divided into multiple portions and they are transmitted by plurality of TCP/IP connections, and thereby, the whole through put is improved.

In a transmission system using the aforesaid plurality of TCP/IP connections, a transmission object file is already existing, and therefore, a premise has been made such that a file size has no change. For this reason,to give an example, in the case of encoding and transmitting an image of two hours, first, a file must be created; for this reason, a problem has arisen such that a user must wait for two hours until a transmission is started. Moreover, in the above transmission system, it is impossible to vary the number of TCP/IP connections. For example, in the case of reduce the number of connections because a network is congested, there is a problem of incapable of reducing the number of connections.

SUMMARY OF THE INVENTION

An object of the present invention is to provide a data transmission apparatus which can transmit a high quality file at a high speed. Moreover,another object of the present invention is to provide a data transmission apparatus which can increase and decrease the number of TCP/IP connections in accordance with a situation of network.

In order to achieve the above objects, the present invention has a first characteristics in a data transmission apparatus which performs a data transmission using a plurality of connections, comprising, a data pack creating section for reading a data from a file at a small unit so as to create a data pack, a transmitting section for allocating a data pack created by the data pack creating section to the plurality of connections, and transmitting the allocated data pack, a transmission control section including a transmission control table for controlling a transmitting data, and a retry queue for writing a data pack which has not been transmitted by a failure generated in a certain connection, wherein the transmission section regards a data pack as a transmission object in the case where the data pack exists in the retry queue, and requests a new data pack to the data pack creating section in the case where no data pack exists in the retry queue.

The present invention has a second characteristics in a re-transmission pointer control section which holds a position of a data of a position nearest to the header of the file for data stored in the transmission control table, as a re-transmission pointer.

Furthermore, the present invention has a third characteristics in transmitting/receiving control means for adding a transmitting section and a receiving section during file transmission, and creating a connection between the transmission section and the receiving section, wherein the added transmitting section acquires a data pack from the retry queue or the data pack creating section, and starts transmission in the same manner as the already provided transmitting section.

According to the above first features, a data of the file is read out at a small unit so as to create a data pack, and then, the data pack thus created is allocated to the plurality of connections to be concurrently transmitted. In the case where the data pack is not sent because a failure is generated in a certain connection, the data pack is written into a retry queue, and then, is re-transmitted via a normal connection. As a result, it is possible to transmit a high quality file at a high speed. Further, according to the above second features, in the case where transmission is interrupted, the transmission is restarted from a position held by a re-transmission pointer, and thereby, it is possible to prevent a re-transmission of data already sent, and thus, to improve a transmission efficiency. Furthermore, according to the above third features, it is possible to increase and decrease the number of connections in accordance with a congested situation of transmission path.

BRIEF DESCRIPTION OF THE DRAWINGS

FIG. 2 is a view showing a construction of a data pack;

FIG. 3 is a view showing a concept of transmission control table; and

FIG. 4A and FIG. 4B are a view to explain a comparison of a required time from encode start to transmission completion between a conventional apparatus and the data transmission apparatus of the present invention.

DETAILED DESCRIPTION OF THE PREFERRED EMBODIMENTS

Figure 1:
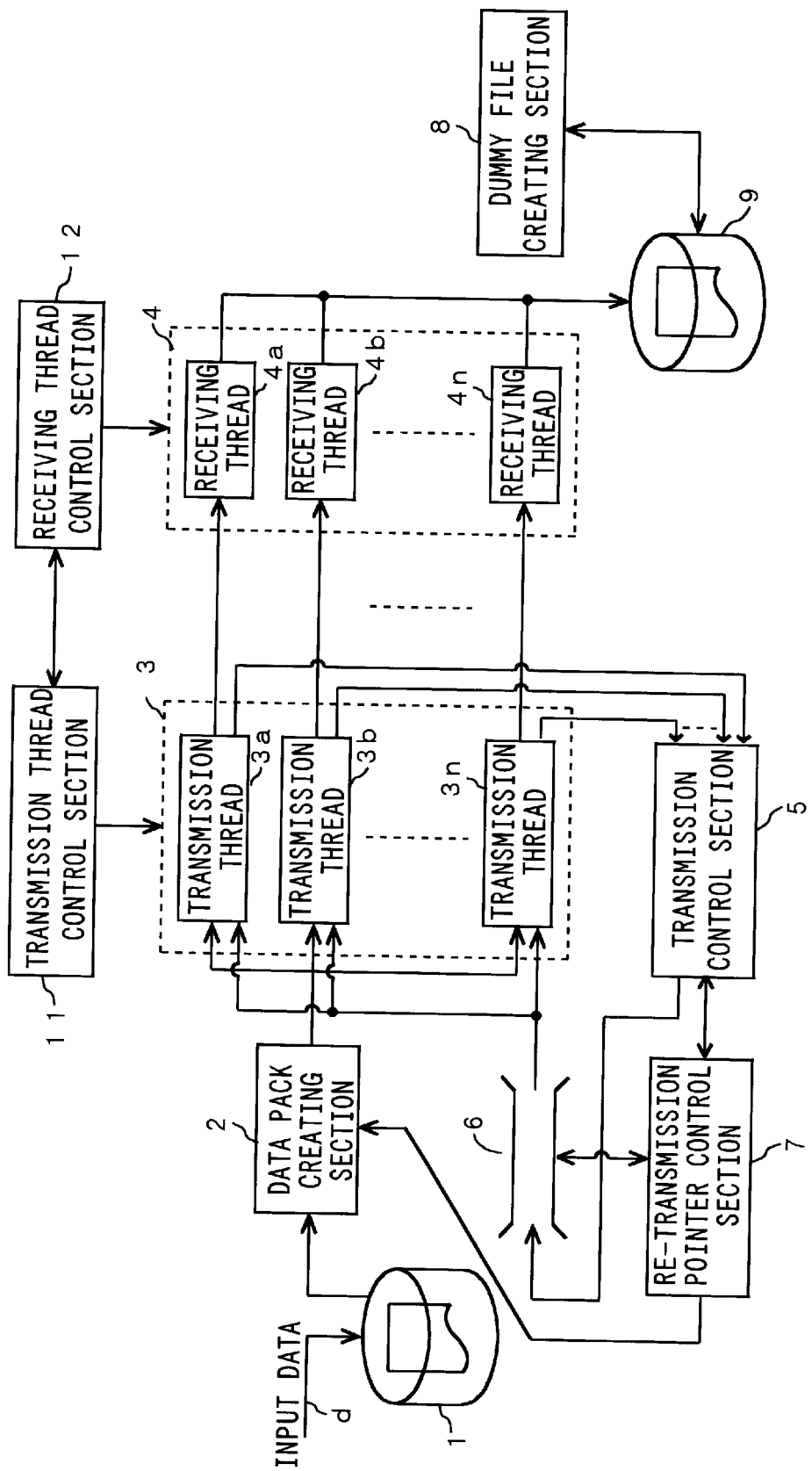
FIG. 1 is a block diagram schematically showing a construction of a data transmission apparatus according to one embodiment of the present invention.

The present invention will be detailedly described below with reference to the accompanying drawings. FIG. 1 is a block diagram schematically showing a construction of a data transmission apparatus according to one embodiment of the present invention.

A magnetic disk 1 stores a file to be transmitted. A data pack creating section 2 reads a predetermined amount of data, for example, 64K bite data from the file stored in the magnetic disk 1, and then, creates a data pack having a predetermined amount of data. As shown in FIG. 2, the data pack is composed of a pack header a showing the number of bytes from the header of file, and a datab. A transmission thread 3 comprises one or plural transmission threads 3a to 3n, and transmits a data pack allocated by the data pack creating section 2 in response to a request from each of the transmission threads 3a to 3n, to one or plural receiving threads 4a to 4n. The transmission threads 3a to 3n are individually operated independently from each other, and request a data pack to be transmitted next to the data pack creating section 2 when the transmission of allocated data pack is completed. Moreover, the transmission threads 3a to 3n register a data pack, a transmission starting flag and file position of the data pack, in a transmission control table (see FIG. 3) of a transmission control section 5 when a transmission is started. Then, when the transmission is completed, the transmission threads 3a to 3n delete the aforesaid data from the transmission control table. In this case, the file position of the data pack is a value showing the number of bytes from the header of the transmission file.

When a transmission error is generated in the transmission threads 3a to 3n, a transmitting data pack is written into a retry queue 6 by the transmission control section 5. At this time, a transmission thread generating a transmission error is deleted (canceled) from the transmission control table. A re-transmission pointer control section 7 investigates the transmission control table and the retry queue 6, and then, finds out a data pack of the position (address) nearest to the header of file from data packs contained in these transmission control table and retry queue 6, and thereafter, registers in the re-transmission pointer the header of the data pack as a re-transmission starting point. When the data pack creating section 2 is notified of the re-transmission pointer, the data pack creating section 2 uses the re-transmission pointer as a starting point, and then, reads a data from the files stored in the magnetic disk 1.

A dummy file creating section 8, which is a receiving side, creates a dummy file in a magnetic disk 9 prior to a receiving start. Receiving threads 4a to 4n are individually operated independently from each other, and then, over-write the received data in the dummy file according to a positional information from the header of file stored in the pack header. A transmission thread control section 11 and a receiving thread control section 12 control the transmission thread 3 and a receiving thread 4, respectively, in order to increase and decrease the number of transmission connections.

Next, an operation of the data transmission apparatus of this embodiment will be described below. First, the following is a description on a procedure for increasing and decreasing the number of transmission connections.

From the reason why a congestion of transmission path is moderated, in order to increase the number of transmission connections, the transmission thread control section 11 requests to increase the number of transmission connections to the receiving thread control section 12. Whereupon the transmission thread control section 11 and the receiving thread control section 12 create one transmission thread and one receiving thread, respectively. And then, the sending side creates a connection; on the other hand, the receiving side waits for a creation of the connection.

On the contrary, from the reason why the transmission path is congested, in order to decrease the number of transmission connections, in the sending side, the transmission thread control section 11 gives an instruction to close a connection with respect to the connection finishing a transmission of data pack, and then, deletes a transmission thread. On the other hand, in the receiving side, when the connection is closed, the receiving thread using the above connection is deleted. It is possible to always carry out an operation for increasing and deleting the above connection during data transmission.

Subsequently, the following is a description on an operation when a file is transmitted. In this case, n transmission connections are established between the sending side and the receiving side, and n-transmission threads 3 participate in transmission. First, the data pack creating section 2 reads 64K byte data, for example, in succession from the files stored in the magnetic disk 1, and then, creates a data pack in succession. Next, the data pack is allocated in succession to then-transmission threads 3 in accordance with a request from the n-transmission threads 3, and thus, a transmission is started.

When the transmission is started, the n-transmission threads 3 register a data pack, a transmission starting flag and a file position of the data pack in the transmission control table of the transmission control section 5. The aforesaid n-transmission threads 3 are individually operated independently from each other. Then, when finishing the transmission of the allocated data pack, the n-transmission threads 3 first investigates the retry queue 6, and if a data pack exists in the retry queue 6 on the basis of the reason described later, transmits the data pack. On the other hand, if no data pack exists in the retry queue 6, the n-transmission threads 3 requests the next data pack to the data pack creating section 2. Moreover, the transmission control section 5 deletes a control data with respect to the data pack finishing a transmission from the transmission control table.

In the receiving side, prior to a receiving start, the dummy file creating section 8 creates a dummy file in the magnetic disk 9. Then-receiving threads 4 are individually operated independently from each other, and over-write a received data into the dummy file of the magnetic disk 9 according to a positional information from the header of file stored in the pack header of the received data pack. Then, when a dummy area are filled with the write of the received data, a new dummy file is added to the last of the dummy file.

Now, during the above transmission, when an error is generated in a certain transmission thread, the transmission thread control section 11 deletes a transmission thread generating the error, and then, writes a transmitting data pack from the transmission control section 5 into the retry queue 6 so as to cancel a registered information on the transmission control table. The data pack written in the retry queue 6 is transmitted by a transmission thread which first finishes a data transmission. In this case, the aforesaid operation is registered in the transmission control table.

In the receiving side, a receiving thread generating an error is deleted. Then, a re-transmission data pack received by other normal receiving thread is stored in the magnetic disk 9.

Next, in the case where a transmission file of the magnetic disk 1 is now being creating, the data pack creating section 2 is in a waiting state until a data required for creating a data pack, for example, a 64K byte encoded input data d is written in a file stored in the magnetic disk 1, and then, creates a data pack at once after the required data of the 64K byte is obtained. As described above, in this embodiment, even if all of transmission object files do not already exist in the magnetic disk 1 like the conventional case, for example, when a 64K byte data is written in the file of the magnetic disk 1, a transmission is started at once. For instance, in the case of encoding and transmitting an image of two hours, in the conventional data transmission apparatus, a user must wait for two hours until a transmission is started. But, according to this embodiment, it is possible to start a transmission at the point of time when the above 64K byte data has been written in the file. Therefore, as shown in FIG. 4, for example, in the case where it takes two hours to create a file, and it takes five hours to make a transmission, in the conventional data transmission apparatus, seven hours is required to finish the transmission (see FIG. 4A). On the contrary, according to this embodiment, it is possible to reduce the required time to about five hours (see FIG. 4B).

Moreover, from the reason why the transmission path is interrupted, when all data transmission is stopped, the re-transmission pointer control section 7 investigates the transmission control table and the retry queue 6, and then, finds out a data pack of the place (address) nearest to the header of transmitting file contained in these transmission control table and retry queue 6, and thus, records the header of the data pack in the re-transmission pointer as a re-transmission starting point. When the transmission is restarted, the data pack creating section 2 creates a data pack from a portion indicated by the re-transmission pointer information, and then, restarts a transmission from the interrupted portion. As a result, it is possible to omit a transmission of the already transmitted data, and to restart a transmission from a non-transmission data nearest to the header of the transmitting file.

Next, the following is a description on the case where a plurality of files is transmitted in parallel by using the data transmission apparatus of this embodiment. In this case, a unique ID is determined for each file, and then, prior to data transmission, the unique ID and sending/receiving file names are exchanged between the sending side and receiving side. The data pack creating section 2 creates a data pack, and then, a file transmission is performed in the same manner as described above.

During the transmission, when all transmissions ends on the midway, the re-transmission pointer control section 7 refers to a re-transmission pointer information by using the aforesaid unique ID, and then, investigates the transmission control table and the retry queue 6. Further, the re-transmission pointer control section 7 finds out a data pack of the position nearest to the header of the transmitting file for data packs contained in these transmission control table and retry queue 6 for each unique ID, and then, records in the re-transmission pointer the header of the data pack as a re-transmission starting point. When the transmission is restarted, the data pack creating section 2 creates a data pack from a portion of each unique ID indicated by the re-transmission pointer information, and then, the transmission is restarted from the interrupted portion.

As is evident from the above description, according to the present invention, a data stored in the file is read out at a small unit so that a data pack is created, and then, the data pack is allocated to a plurality of connections, and thus, a transmission is performed. Therefore, it is possible to transmit a high quality file to a remote site at a high speed. More specifically, even if a transmission file is now being creating, it is possible to start the transmission. For example, in the case of transmitting an image contents of two hours, in the conventional case, it takes two hours to perform an encode operation (file creation), and then, a transmission is started after the encode operation ends. In the present invention, a transmission is started while the encode operation being started; therefore, it is possible to perform in parallel the encode operation of two hours and a data transmission.

Moreover, according to the present invention, when the transmission is interrupted, the re-transmission pointer control section 7 records in the re-transmission pointer the header of the data pack of the position nearest to the header of the transmitting file as a re-transmissionstarting point, and then, when the transmission is restarted, a re-transmission is started from the place indicated by the re-transmission pointer. Therefore, it is possible to effectively perform a data transmission without waste.

During transmission, it is possible to increase and decrease the number of connections in accordance with a congested situation of transmission path, and thus, to provide a flexible transmission path having a high through put.

What is claimed is:

1. A data transmission apparatus which performs a data transmission using a plurality of connections, comprising:
   a data pack creating section for reading a data from a file at a small unit so as to create a data pack;
   a transmitting section for allocating a data pack created by the data pack creating section to the plurality of connections, and transmitting the allocated data pack;
   a transmission control section including a transmission control table for controlling a transmitting data; and
   a retry queue for writing a data pack which has not been transmitted by a failure generated in a certain connection,
   wherein the transmission section regards a data pack as a transmission object in the case where the data pack exists in the retry queue, and requests a new data pack to the data pack creating section in the case where no data pack exists in the retry queue.

2. The data transmission apparatus according to claim 1, wherein further includes a re-transmission pointer control section which holds a position of a data of a position nearest to the header of the file for data stored in the transmission control table, as a re-transmission pointer.

3. The data transmission apparatus according to claim 2, wherein the re-transmission pointer control section holds a position of a data pack of a position nearest to the header of the file for data packs stored in the transmission control table and the retry queue, as a re-transmission pointer.

4. The data transmission apparatus according to claim 3, wherein the data pack creating section reads out a data of a plurality of files at a small unit so as to create a data pack,
   the re-transmission pointer control section holds a re-transmission pointer together with an ID given to the plurality of files, and
   wherein the plurality of files are concurrently transmitted in parallel.

5. The data transmission apparatus according to claim 4, wherein the data pack creating section reads out a data file, which is in a progress of creation, at a small unit so as to create a data pack.

6. The data transmission apparatus according to claim 2, wherein when a transmission is restarted after data transmission is interrupted, the data pack creating section starts to create a data pack from a portion indicated by the re-transmission pointer.

7. The data transmission apparatus according to claim 3, wherein when a transmission is restarted after data transmission is interrupted, the data pack creating section starts to create a data pack from a portion indicated by the re-transmission pointer.

8. The data transmission apparatus according to claim 1, wherein the data pack creating section reads out a data of a plurality of files at a small unit so as to create a data pack, wherein the plurality of files are transmitted in parallel.

9. The data transmission apparatus according to claim 8, wherein the data pack creating section reads out a data of file, which is in a progress of creation, at a small unit so as to create a data pack.

10. The data transmission apparatus according to claim 1, wherein the data pack creating section reads out a data of file, which is in a progress of creation, at a small unit so as to create a data pack.

11. A data transmission apparatus which performs a data transmission using a plurality of connections, comprising:
    a data pack creating section for reading a data from a file at a small unit so as to create a data pack;

a transmitting section for allocating a data pack created by the data pack creating section to the plurality of connections, and transmitting the allocated data pack;

a transmission control section including a transmission control table for controlling a transmitting data;

a retry queue for writing a data pack which has not been transmitted by a failure generated in a certain connection; and transmitting/receiving control means for adding a transmitting section and a receiving section during file transmission, and creating a connection between the transmission section and the receiving section, wherein the added transmitting section acquires a data pack from the retry queue or the data pack creating section, and starts transmission in the same manner as the already provided transmitting section.

12. The data transmission apparatus according to claim 11, wherein the transmitting/receiving control means closes a transmitting section finishing a data transmission and a connection corresponding to the transmitting section, in order to reduce the transmitting section and the receiving section, and subsequently, closes the receiving section.

* * * * *